Patented Aug. 7, 1934

1,969,210

UNITED STATES PATENT OFFICE 1,969,210

DYESTUFF OF THE ANTHRAQUINONE-ACRIDONE SERIES AND PROCESS OF PREPARING THE SAME

William Dettwyler, Milwaukee, and Ivan Gubelmann, South Milwaukee, Wis., assignors, by mesne assignments, to E. I. du Pont de Nemours & Company, a corporation of Delaware No Drawing. Application August 13, 1931, Serial No. 556,936

11 Claims. (Cl. 260—37)

This invention relates to novel dyestuffs of the anthraquinone-acridone series. It is an object of this invention to produce novel brown vat dyestuffs possessing valuable dyeing characteristics. Other and further objects of this invention will become apparent as the description proceeds.

In copending application Serial No. 556,938, filed of even date herewith, we have described a series of novel anthrimide-acridone compounds of the general formula:

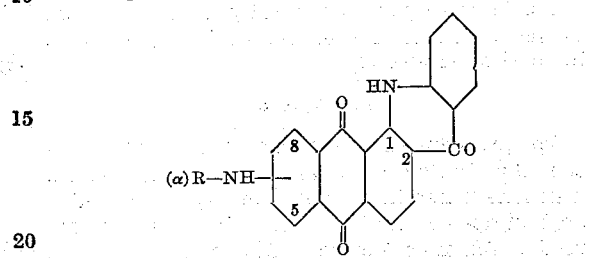

wherein R stands for a radical of the anthraquinone series which may be further substituted by imino-radicals, while ($\alpha$) indicates that the group R—NH— occupies one of the positions 5 and 8 in the acridonyl-anthraquinone nucleus, the positions of the heterocyclic ring being designated as 1, 2. These novel anthrimide-acridone compounds may be prepared by several methods, one of which consists of condensing in the presence of a copper salt and an inorganic base 5- or 8-amino-1,2-anthraquinone-acridone and a halogen anthraquinone body, for instance, $\alpha$- or $\beta$-chloro-anthraquinone, 1,5-dichloro-anthraquinone, 1-chloro-5-benzoylamino-anthraquinone, and the like.

We have now found that these novel anthrimide-acridone compounds, although valuable dyestuffs in themselves, may be further condensed to give vat dyestuffs of different color and qualities. More particularly, we found that when said anthrimide-acridone compounds are heated with metal halides condensing agents such as aluminum chloride, zinc chloride, ferric chloride and the like, the said compounds are converted into novel and very valuable dyestuffs of generally brown shades. In this reaction evidently a ring is formed about and involving the imide (—NH—) group; however, it is not conclusive whether the product is an acridine or a carbazole compound. In analogous reactions in the art involving the heating of an anthrimide with a metallic chloride, the authorities seem to disagree sharply as to the nature of the ring formed. Some believe that the ring is of an acridine nature, involving the N atom from the imide group, and the adjacent meso C atom of one of the anthraquinone nuclei. Other authorities, however, insist that the ring is of a carbazole nature involving the N atom of the imide group, and the two adjacent beta C atoms of the anthraquinone nuclei. In view of this uncertainty as to the precise nature of the ring formed, we shall hereinafter refer to our condensation products merely as ring-closed condensation products of the respective anthrimides.

Without limiting our invention to any particular procedure, the following examples are given to illustrate our preferred mode of operation. Parts given are parts by weight.

Example 1

60 parts of common salt (NaCl) and 40 parts of aluminum chloride (anhydrous) are melted together at 140° C. and into this melt are introduced 10 parts 8-$\alpha$-anthraquinonylamino-1,2-anthraquinone-benzacridone. (Example 1 of copending application Serial No. 556,938. The formula of the initial material is most probably

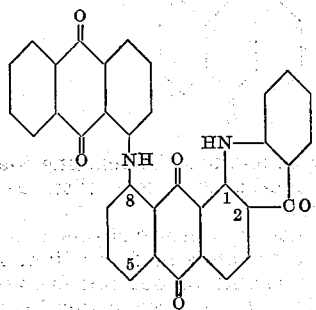

and it may be prepared by reacting 8-amino-1,2-anthraquinone-benzacridone with $\alpha$-chloro-anthraquinone). The melt is stirred at about 140 to 145° C. for 1 hour, then poured into 1000 parts of hot water, boiled and filtered. The filter cake is washed with hot water until free of inorganic salts, dried and ground.

The product is a brownish-black powder; insoluble in water, dilute acids, or dilute alkalis. It is sparingly soluble in hot nitrobenzene with a cherry red coloration. It dissolves readily in concentrated sulfuric acid with a red brown color, but precipitates therefrom on dilution with water in the form of brown flocks. If the dilution is regulated carefully until the concentration of sulfuric acid in the mass is about 78%, the dyestuff precipitates in the form of needle-like crystals which may be filtered off. This procedure may be used to effect purification of the dyestuff.

The above product is readily soluble in the usual alkaline hydrosulfite vat with a dark-brown to black color from which cotton is dyed in yellowish brown to brown shades of excellent fastness qualities.

If the above product is chlorinated in the usual manner, for instance by means of chlorine gas in nitrobenzene suspension, its solubility in the hydrosulfite vat is decreased.

*Example 2*

100 parts of zinc chloride are fused at a temperature of about 230° C., the fusion at low temperature being facilitated by the addition of water. 10 parts of 8-α-anthraquinonylamino-1,2-anthraquinone-benzacridone are now introduced. The melt is stirred at 220–230° C. for 1 hour, and the dyestuff is isolated as in Example 1. The product obtained is identical in properties with that in Example 1.

*Example 3*

The procedure is the same as in Example 1, except that in lieu of the anthrimide therein mentioned, herein 10 parts of 5-α-anthraquinonylamino-1,2-anthraquinone-benzacridone are used. (Example 2 of copending application Ser. No. 556,938. The formula of this compound is most probably:

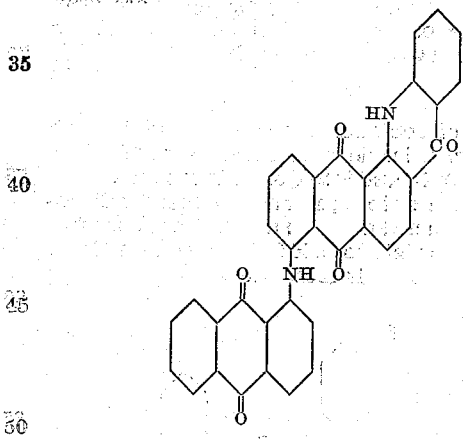

and it may be obtained by reacting 5-amino-1,2-anthraquinone-benzacridone with α-chloro-anthraquinone.)

The product is a brownish-black powder; insoluble in water, dilute acids, or dilute alkalis. It is sparingly soluble in hot nitrobenzene with a red coloration. It dissolves readily in concentrated sulfuric acid with a red brown color, but precipitates therefrom on dilution with water in the form of brown flocks. If the dilution is regulated carefully until the concentration of sulfuric acid in the mass is about 78%, the dyestuff precipitates in the form of fine crystals which may be filtered off. This procedure may be used to effect purification of the dyestuff.

The above product is readily soluble in the usual alkaline hydrosulfite vat with a dark-brown to black color from which cotton is dyed in brown shades of excellent fastness qualities.

*Example 4*

60 parts of common salt (NaCl) and 40 parts of aluminum chloride (anhydrous) are melted together at 140° C., and into this melt are introduced 10 parts of 1,5-bis (1,2-benzacridonyl-8-anthraquinonylamino)-anthraquinone. (Example 3 of copending application Ser. No. 556,938. The formula of this compound is most probably:

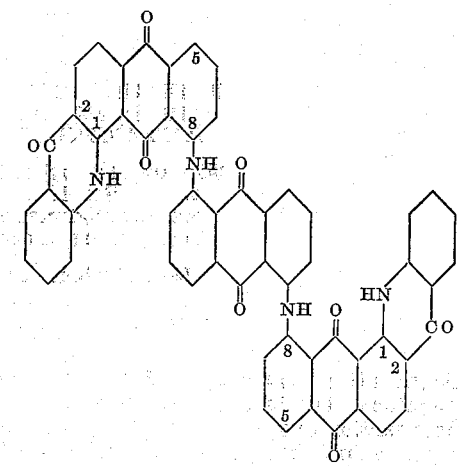

and it may be prepared by reacting 2 moles of 8-amino-1,2-anthraquinone-benzacridone with 1 mole of 1,5-dichloro-anthraquinone. The melt is stirred at about 140 to 145° C. for about 1 hour, and the reaction product isolated as in Example 1.

The product has in general properties similar to that of Example 1, except that it dyes cotton in red-brown shades.

*Example 5*

The procedure is the same as in Example 1, except that in lieu of the anthrimide body therein mentioned, herein 10 parts of 8-β-anthraquinonylamino-1,2-anthraquinone-benzacridone are used. (Example 4 of copending application Ser. No. 556,938. The formula of this compound is most probably:

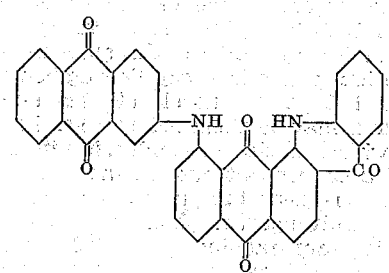

and it may be prepared by reacting 8-amino-1,2-anthraquinone-benzacridone with β-chloro-anthraquinone.

The product is a black powder; insoluble in water, dilute acids or dilute alkalis. It is somewhat soluble in hot nitrobenzene with a red coloration. It dissolves readily in concentrated sulfuric acid with a red brown color, but precipitates therefrom upon dilution with water in the form of brown flocks. It is readily soluble in the usual hydrosulfite vat with a brown to black color, from which cotton is dyed in brown shades.

*Example 6*

The procedure is the same as in Example 1, except that as initial material here 10 parts of 8-(5'-benzoylamino-1'-anthraquinonyl-amino)-1,2-anthraquinone-benzacridone are used. (Example 5 of copending application Ser. No. 556,938. The formula of this compound is most probably:

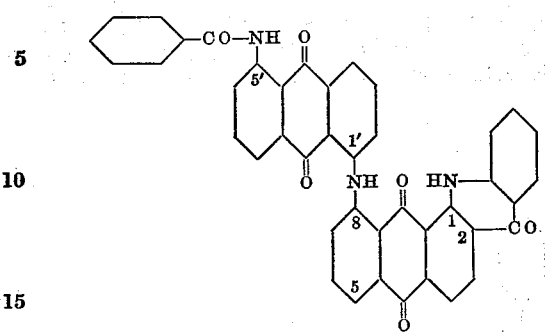

and it may be prepared by reacting together 8-amino-1,2-anthraquinone-benzacridone with 1-chloro-5-benzoylamino-anthraquinone.

The product is a dark-brown to black powder; insoluble in water, dilute acids or dilute alkalis. It is somewhat soluble in hot nitrobenzene with a cherry red color. It dissolves readily in concentrated sulfuric acid with a brownish-red color, but precipitates therefrom upon dilution with water in the form of dark-brown flocks. It is readily soluble in the usual hydrosulfite vat with a brownish color, from which cotton is dyed in brown shades.

It will be understood that many variations and modifications are possible in our preferred procedure, without departing from the spirit of this invention.

In the above disclosure it should be understood that wherever we are referring to the dyeing of cotton, we imply, of course, the usual procedure of dyeing with vat dyestuffs, involving at the end an aeration or oxidation of the dyed material.

In the claims below it should be understood that where new products, dyestuffs, or articles of manufacture are claimed, we mean to include these bodies not only in substance, but also in whatever state they exist when applied to material dyed, printed, or pigmented therewith.

We claim:

1. The process of producing vat dyestuffs which comprises heating with a metal halide condensing agent an anthrimide-acridone body of the following general formula:

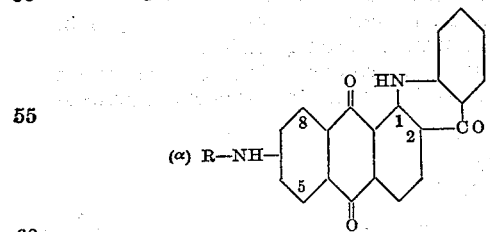

wherein R stands for a radical of the anthraquinone series, while ($\alpha$) indicates that the NH group is attached to one of the positions 5 and 8.

2. The process of producing vat dyestuffs which comprises heating with a metal halide condensing agent an anthrimide-acridone body of the following general formula:

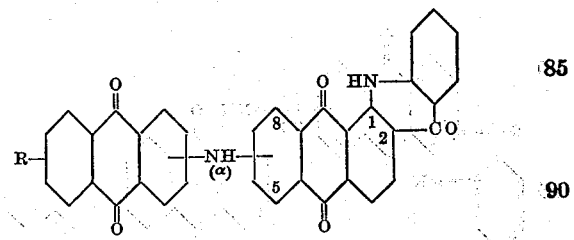

wherein R stands for a hydrogen atom, an aroyl-imino group of the benzene series, or a radical of the type

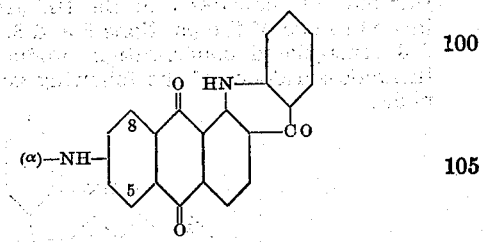

and wherein ($\alpha$) indicates that the NH group is attached to one of the positions 5 and 8.

3. The process of producing vat dyestuffs which comprises heating with a metal halide condensing agent an anthrimide-acridone body of the following general formula:

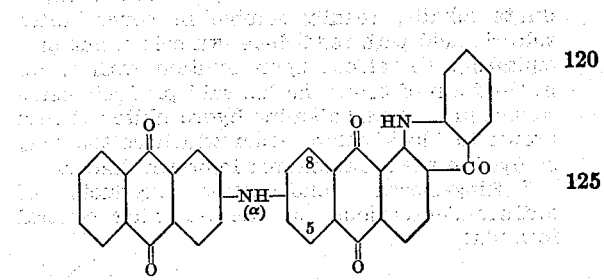

wherein ($\alpha$) indicates that the NH group is attached to one of the positions 5 and 8.

4. The process of producing vat dyestuffs which comprises heating with a metal halide condensing agent an anthrimide-acridone body of the following general formula:

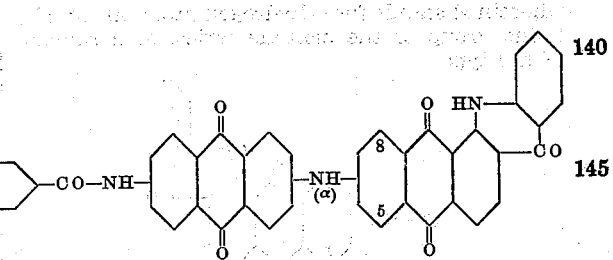

wherein (α) indicates that the NH group is attached to one of the positions 5 and 8.

5. The process of producing vat dyestuffs which comprises heating with a metal halide condensing agent an anthrimide-acridone body of the following general formula:

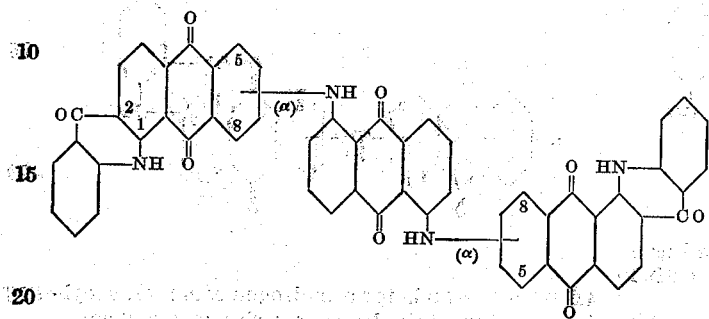

wherein (α) indicates that the NH group is attached to one of the positions 5 and 8.

6. Ring-closed condensation products of anthrimide-acridones of the following general formula:

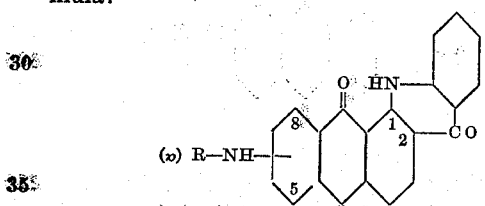

wherein R stands for a radical of the anthraquinone series, while (α) indicates that the NH group is attached to one of the positions 5 and 8; said products being in solid form generally dark powders, insoluble in water, dilute acids, or dilute alkalis; readily soluble in concentrated sulfuric acid with reddish-brown colors, but precipitating therefrom upon dilution with water in the form of brown flocks; said products being soluble in the usual alkaline hydrosulfite vat with brown to black colors, from which cotton may be dyed in the usual manner in brown shades.

7. Ring-closed condensation products of anthrimide-acridones of the following general formula:

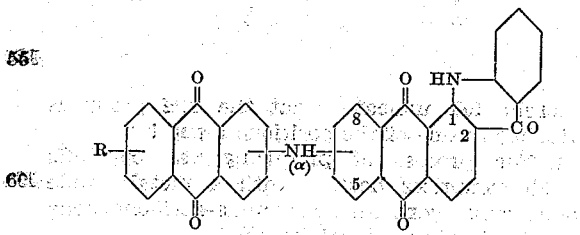

wherein R stands for a hydrogen atom, an aroylimino group of the benzene series, or a radical of the type

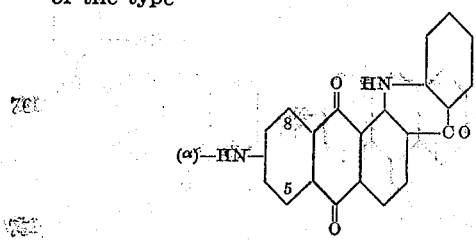

and wherein (α) indicates that the NH group is attached to one of the positions 5 and 8; said products being in solid form generally dark powders, insoluble in water, dilute acids, or dilute alkalis; readily soluble in concentrated sulfuric acid with reddish-brown colors, but precipitating therefrom upon dilution with water in the form of brown flocks; said products being soluble in the usual alkaline hydrosulfite vat with brown to black colors, from which cotton may be dyed in the usual manner in brown shades.

8. A ring-closed condensation product of an anthrimide-acridone of the following general formula:

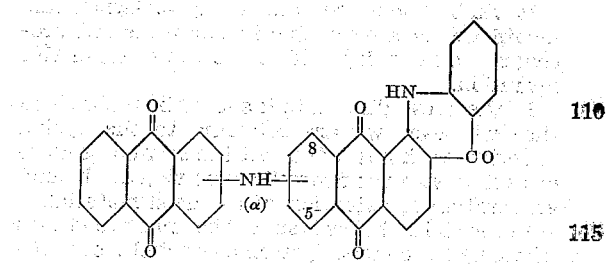

wherein (α) indicates that the NH group is attached to one of the positions 5 and 8; said product being in solid form a brownish-black powder; insoluble in water, dilute acids or dilute alkalis; readily soluble in concentrated sulfuric acid with a red brown color, but precipitating therefrom upon dilution with water in the form of brown flocks; said product being soluble in the usual alkaline hydrosulfite vat with a dark-brown to black color from which cotton may be dyed in the usual manner in brown shades.

9. A ring-closed condensation product of an anthrimide-acridone of the following general formula:

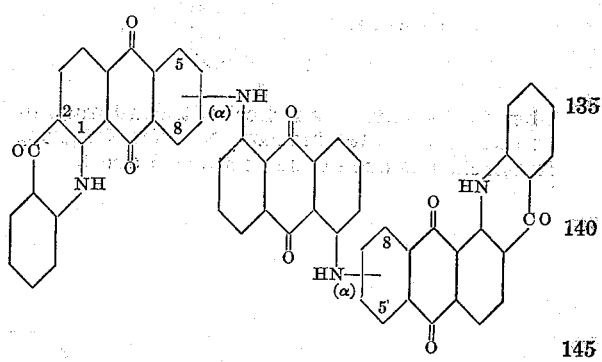

wherein (α) indicates that the NH group is attached to one of the positions 5 and 8; said product being in solid form a brownish-black powder; insoluble in water, dilute acids, or dilute alkalis;

readily soluble in concentrated sulfuric acid with a red brown color, but precipitating therefrom upon dilution with water in the form of brown flocks; said product being soluble in the usual alkaline hydrosulfite vat with a dark-brown to black color from which cotton may be dyed in the usual manner in red-brown shades.

10. The process of producing vat dyestuffs which comprises heating with a metal halide condensing agent an anthrimide-acridone body of the following general formula:

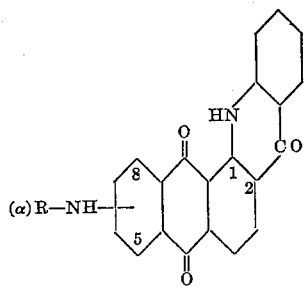

wherein R stands for a radical of the anthraquinone series which may be further substituted by an aroyl-imino group of the benzene series or by a benzacridone ring, while (α) indicates that the NH group shown is attached to one of the positions 5 and 8.

11. Ring-closed condensation products of anthrimide-acridones of the following general formula:

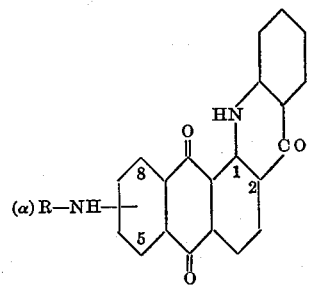

wherein R stands for a radical of the anthraquinone series which may be further substituted by an aroyl-imino group of the benzene series or by a benzacridone ring, while (α) indicates that the NH group shown is attached to one of the positions 5 and 8; said products being in solid form generally dark powders, insoluble in water, dilute acids, or dilute alkalis; readily soluble in concentrated sulfuric acid with reddish-brown colors, but precipitating therefrom upon dilution with water in the form of brown flocks; said products being soluble in the usual alkaline hydrosulfite vat with brown to black colors, from which cotton may be dyed in the usual manner in brown shades.

WILLIAM DETTWYLER.
IVAN GUBELMANN.